Aug. 16, 1960      R. H. THORNER      2,949,016
DEFROSTING CONTROL MEANS FOR REFRIGERATION APPARATUS
Filed Jan. 5, 1955      5 Sheets-Sheet 1

INVENTOR.
Robert H. Thorner
BY
Owen & Owen
ATTORNEYS

INVENTOR.
Robert H. Thorner
BY
ATTORNEYS

Aug. 16, 1960 R. H. THORNER 2,949,016
DEFROSTING CONTROL MEANS FOR REFRIGERATION APPARATUS
Filed Jan. 5, 1955 5 Sheets-Sheet 3

INVENTOR.
Robert H. Thorner
BY
ATTORNEYS

Aug. 16, 1960 R. H. THORNER 2,949,016
DEFROSTING CONTROL MEANS FOR REFRIGERATION APPARATUS
Filed Jan. 5, 1955 5 Sheets-Sheet 4

INVENTOR.
Robert H. Thorner
BY
ATTORNEYS

Aug. 16, 1960 R. H. THORNER 2,949,016
DEFROSTING CONTROL MEANS FOR REFRIGERATION APPARATUS
Filed Jan. 5, 1955 5 Sheets-Sheet 5

INVENTOR.
Robert H. Thorner.
BY
ATTORNEYS

United States Patent Office 2,949,016
Patented Aug. 16, 1960

2,949,016

DEFROSTING CONTROL MEANS FOR REFRIGERATION APPARATUS

Robert H. Thorner, 3410 W. Chicago Blvd., Detroit, Mich.

Filed Jan. 5, 1955, Ser. No. 480,025

28 Claims. (Cl. 62—153)

The present invention relates primarily to a control device for defrosting systems of refrigerator apparatus.

It is a characteristic of refrigerators that moisture tends to condense from the air therein and deposit and freeze on the surfaces of the evaporator coil and freezing compartment, whereby a coating of ice or frost gradually builds up on such cooling surfaces. This layer of ice is undesirable since it acts as an insulator for the transfer of heat from the food compartment to the cooling unit thereby reducing the efficiency thereof. The moisture from which the frost forms condenses from air in the refrigerator, even with the door closed; each time the door is opened a portion of this air is replaced with fresh air which contains additional moisture to condense and freeze on the cooling unit. Obviously, the more humid the air the large the formation of frost, and conversely. Hence it is highly desirable to remove this ice-coating from the cooling unit often enough, such as once each day for example, to obtain maximum transfer of heat from the food compartment to the cooling unit.

Automatic defroster controls are used extensively with that form of domestic refrigerator in which one evaporator coil serves for both a frozen food compartment as well as the compartment in which food is stored at temperatures above freezing. The temperature of this evaporator coil is below freezing, and usually only one door is provided for this single coil refrigerator. Since frost forms readily on this coil, automatic defrosting systems and control devices therefor are used primarily in such single-coil refrigerators.

Numerous automatic and semi-automatic defrosting systems and control devices therefor have been proposed and/or used with the intention of automatically removing the frost from the cooling unit in a satisfactory manner. In many of these systems, heating means are provided to melt the frost quickly without melting frozen foods. In such systems, several distinct steps are required to remove the frost or ice, and these steps are regulated by the defroster control device. First, a period of time is provided during which the frost forms on the cooling unit surfaces. Secondly, means are provided to activate the heating means of the defrosting system. Thirdly, means are provided to control the duration of the heating or defrosting action; and finally means are provided to inactivate the heating means thereby terminating the defrosting action. The means controlling the time interval during which the frost build-up is permitted should operate generally as a function of the amount of frost formation. However, while a definite relation of this interval to the amount of frost formation is desirable, it is not critical. This is evidenced by the numerous semi-automatic defroster control devices having manual push-button means to initiate the defrosting action, but having automatic means to terminate the defrosting action. In such manually-initiated defroster controls the intervening period between defrosting actions may be one day or two weeks for example. Also, for automatic initiation of the defroster action, clock mechanisms have been widely used to produce a defrosting action once per day, for example; but frost formation is not a function of time alone. Presently used clock mechanisms tend to be noisy and complex which tends to make them unreliable and costly.

It is critical, however, that the duration of the defrosting or melting period be carefully regulated since most present-day domestic refrigerators are used for the storage of froozen foods. If such frozen foods are subjected to any temperature above freezing for a sufficient length of time, they will melt and spoil. Therefore, it is desirable to concentrate or localize the heat of the defroster system as near to the frost formation as possible for the melting thereof while holding the ambient temperature of the air around the frozen foods as low as possible, such as not more than 40° F., for example.

The aforesaid clock mechanisms have been used also for controlling the duration of the defrosting action as well as the initiation thereof. But in addition to the foregoing undesirable characteristics of clock mechanisms, the melting of frost is not a function of time alone, since more time is required to melt a larger accumulation of frost tthan a small formation of frost. Many present defroster controls regulate the defrosting period by means of a gas-filled bellows having a temperature bulb to sense only the ambient temperature in the vicinity of the frozen foods. Such temperature-sensing elements are not only expensive, but the gas therein is affected by variations in air density, particularly in localities where the barometric pressure may be 25 inches of mercury, for example. Accordingly altitude or air-density compensation means frequently are provided to compensate for low barometric pressures. Also, the melting of the frost is a function of time as well as temperature since the frozen food will melt at a high temperature and a short time or at a lower temperature (but still above freezing temperature) and a longer time. However, if the defroster control is made subject to temperature alone, and, for example 40° F. is selected as the temperature sufficient to permit all of a heavy accumulation of frost to melt, then light accumulations of frost might be melted earlier such as 37° F.; but the temperature must still rise to 40° F. in such temperature-sensitive control devices before the defroster will be inactivated.

Present defroster controls have not performed satisfactorily in accordance with the foregoing requirements. In many cases, the controls have been wholly useless because the particular structure violates practical requirements. For example, the manufacturers of refrigerators will not permit an electric switch with its attendant wiring to be installed inside the food compartments of a domestic refrigerator; and many of the controls disclosed in the patent art would necessitate a violation of this requirement.

It is a principal object of the present invention to provide a simple, inexpensive, quiet, trouble-free and consistent automatic control device for preventing the formation of excessive frost in the cooling unit of a refrigerating machine, which excessive frost would be deterimental to the efficient operation of the machine, and to the effect intermittent melting of the limited amount of frost which does form on the cooling unit.

A further object of the present invention is to provide an automatic control device of simple and reliable construction to modify temporarily the normal operation of a refrigerating machine when a detrimental amount of frost forms on the cooling unit thereof, and to restore the machine to its normal operation when substantially all of the frost melts therefrom.

Another principal object of the present invention is to provide a control device of the type defined in the preceding paragraph in which novel, reliable, and simple release mechanism is incorporated to accomplish the desired result which novel mechanism may be used, per se, in control devices associated with any controlled conditions other than the formation of frost or ice.

A main object of the present invention is to provide an automatic defroster control device for a refrigerator, which device is responsive to the melting of ice and is wholly independent of air density variations, to control the defrosting period and to terminate same, and which by virtue of its inherent simplicity lends itself to low cost manufacture.

A principal object of the present invention is to provide an automatic defroster control for a refrigerator, which device is of simple, consistent, reliable, and noise-free construction wherein the initiation of the defrosting action is made in response to a predetermined number of refrigerator or compressor cycles, and the defrosting period and the termination thereof is controlled by novel means responsive to the melting of ice.

A further object of the present invention is to provide an automatic defroster control device for a refrigerator, which device is of simple, consistent, reliable and noise-free construction wherein the initiation of the defrosting action is made automatically after a predetermined number of door movements, and the defrosting period and the termination thereof is controlled by novel means dependent on the melting of ice.

Another object of the present invention is to provide a semi-automatic defroster control device for a refrigerator, which device is of simple, consistent, reliable, and noise-free construction lending itself to low-cost manufacture wherein the initiation of the defrosting action is accomplished by manual means, and the duration of the defrosting period and the termination thereof is controlled by novel means dependent on the melting of ice.

Another object of the present invention is to provide a mechanism affected by the freezing of liquid in a fixed vessel having a movable member immersed in said liquid wherein the vessel and member are in effect connected by frozen-liquid, which connection is altered upon the melting of said liquid.

Another object of the present invention is to provide an automatic defroster control device for a refrigeration machine in which the sensing member controlling the defrosting period and the termination thereof is immersed in a rigidly mounted vessel filled with water wherein the vessel and sensing member are in effect connected by an "ice-connection" which connection is altered upon the melting of said ice.

A further object of the present invention is to provide an automatic defroster control device defined in the preceding paragraph in which the vessel is so installed to receive melted frost from the cooling unit for maintaining proper water level in the vessel to replenish the evaporation losses therefrom.

Still another object of the present invention is to provide a mechanism affected by the formation of frost having a member slidable adjacent a fixed surface subject to the formation of frost wherein the member and surface are in effect joined by a "frost-connection."

An important object of the present invention is to provide an automatic defroster control device for a refrigeration machine, in which a novel counting mechanism is provided to effect initiation of the defrosting action after a predetermined number of compressor cycles or door movements, which novel mechanism may be used, per se, in any mechanical device.

Other objects and advantages of the invention will become apparent from the following description and from the accompanying drawings in which—

Figure 1:
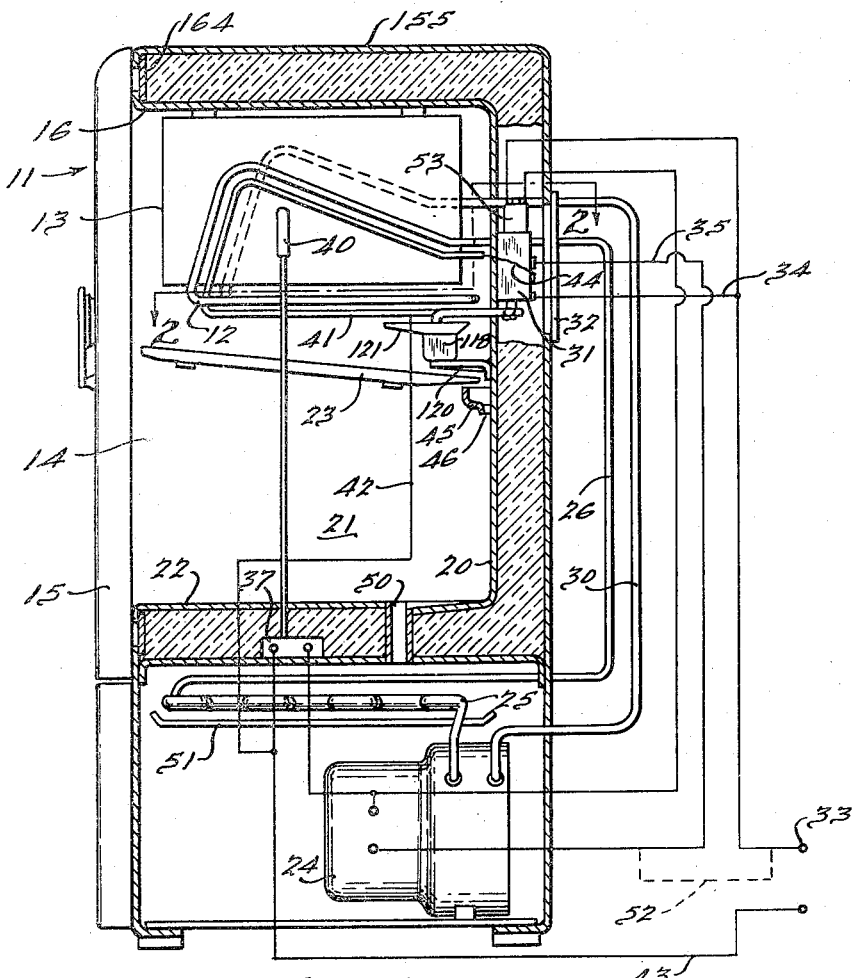
Fig. 1 is a somewhat diagrammatic partial sectional view of a refrigerator cabinet and mechanism embodying the present invention.
Figure 3:
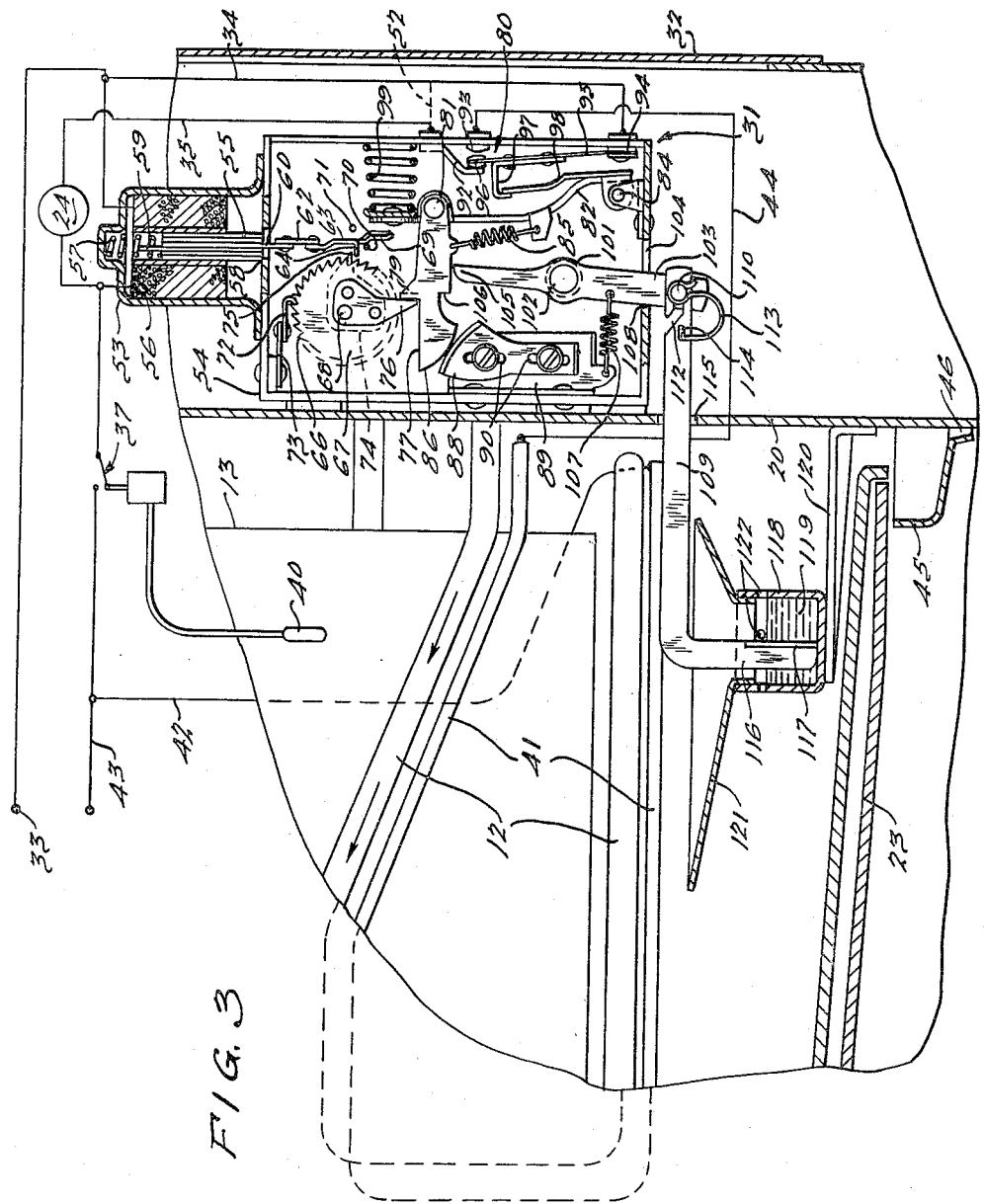
Figure 5:
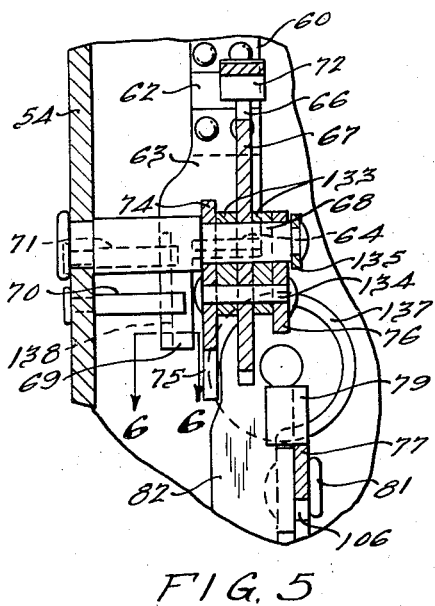
Figure 7:
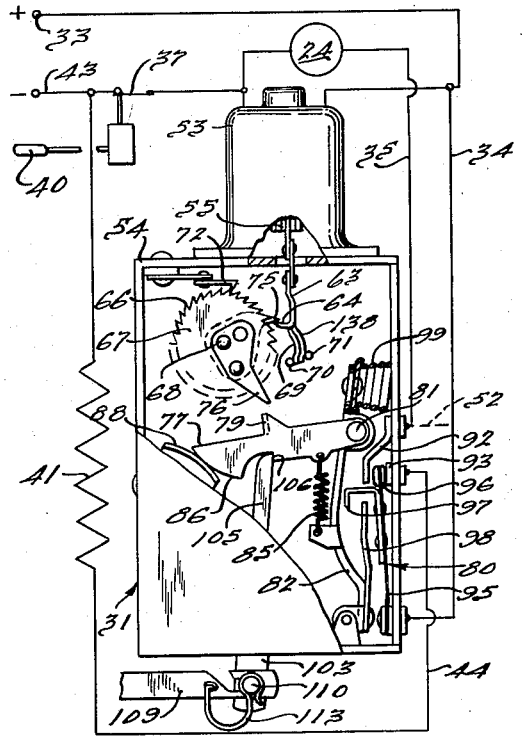
Figure 4:
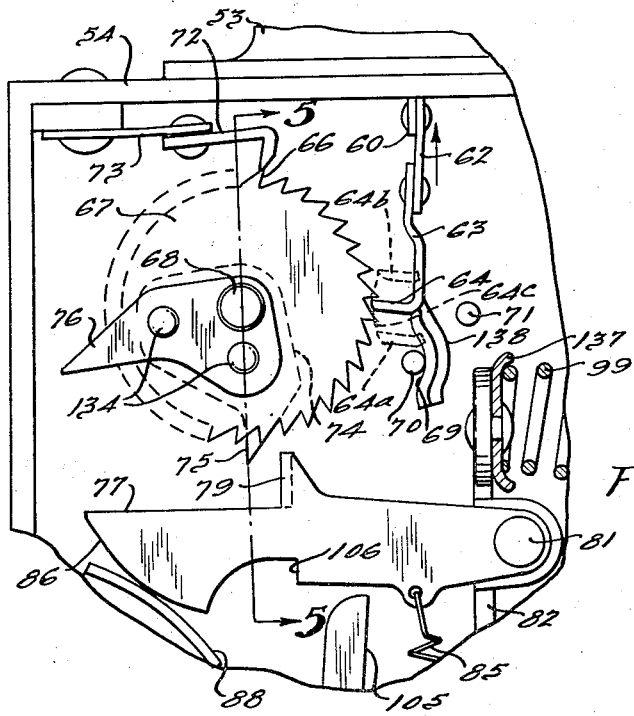
Figure 6:
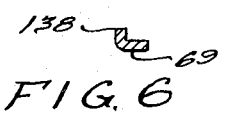
Figure 8:
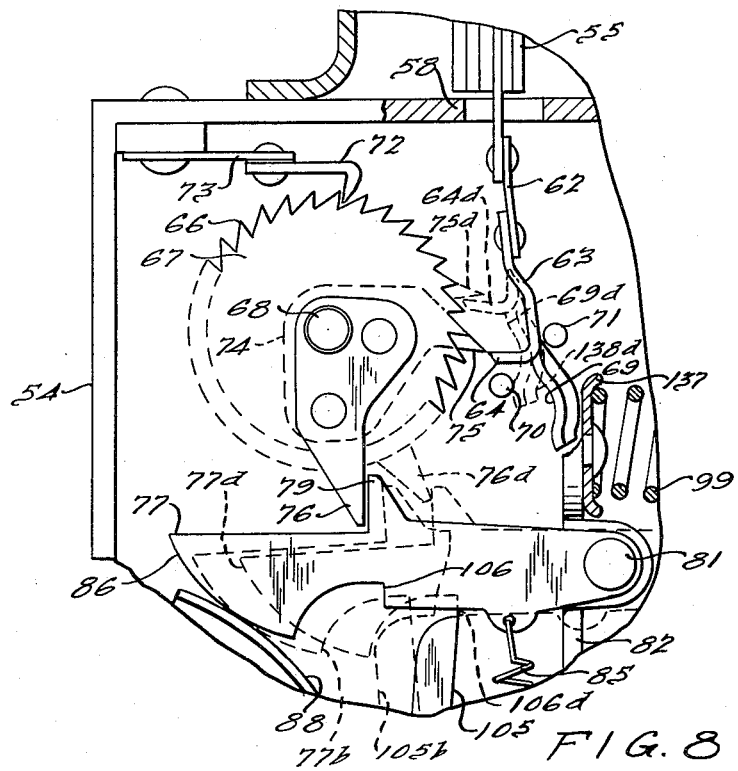
Figure 9:
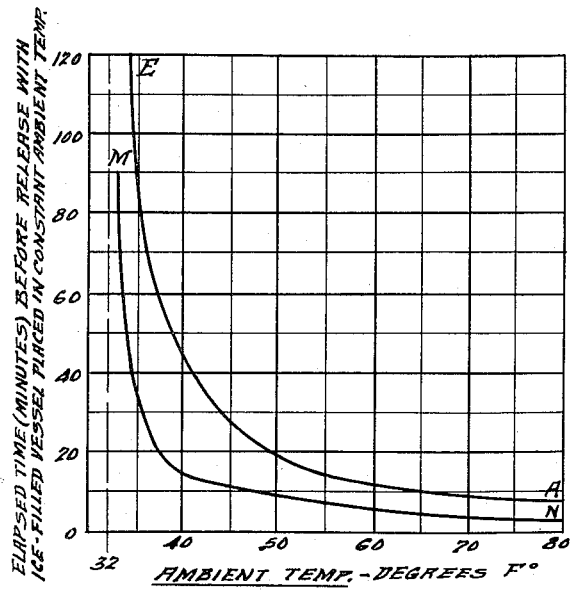
Figure 10:
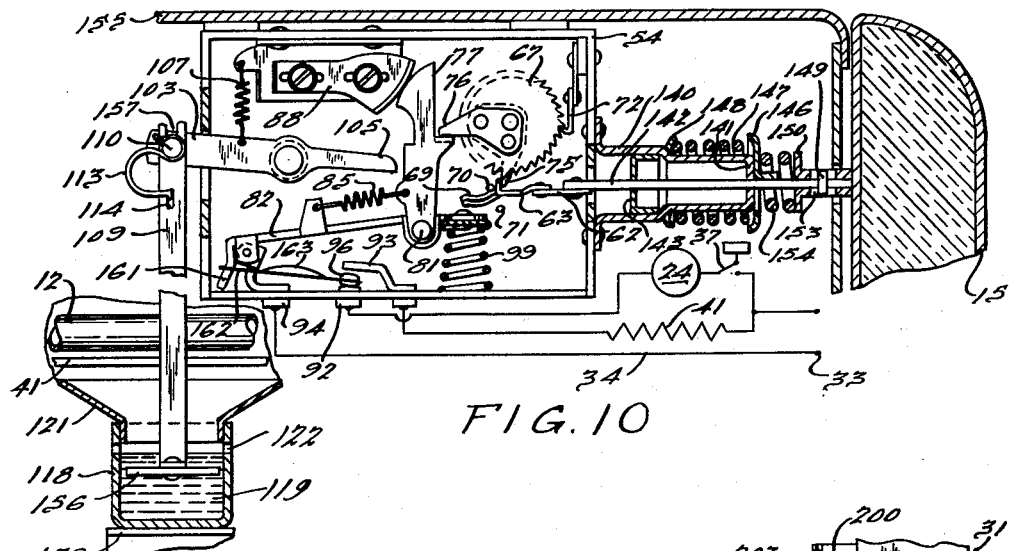
Figure 14:
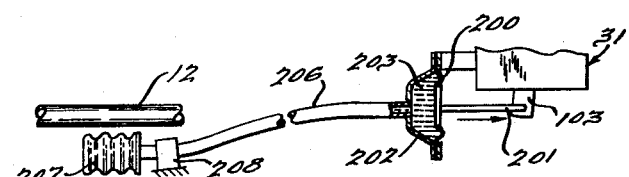
Figure 12:
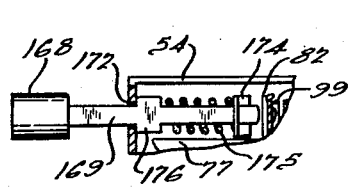
Figure 11:
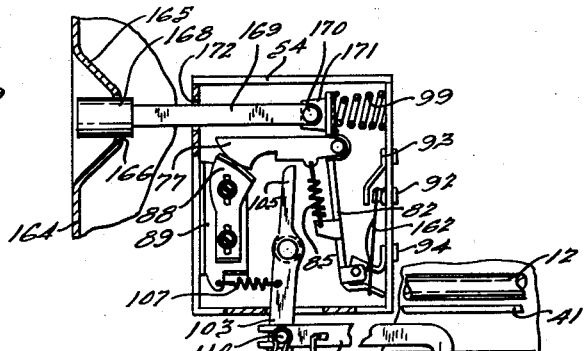
Figure 13:
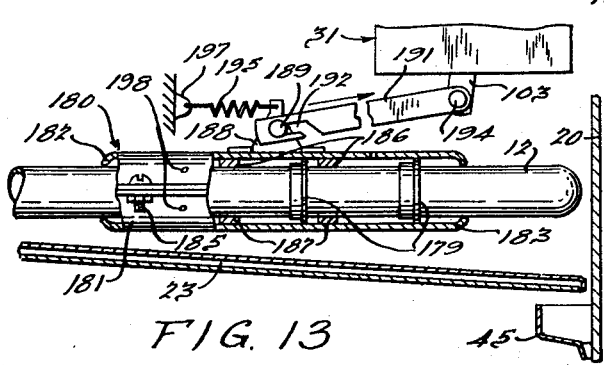

Fig. 3 is a somewhat diagrammatic enlarged fragmentary view of the installation illustrated in Fig. 1 and shows an embodiment of my control device with the cover plate removed and portions thereof in section, in which the defrosting system is activated after a predetermined number of compressor cycles, and the defrosting period and termination thereof are controlled by ice means, and which includes portions of the refrigerator apparatus shown in Fig. 1 for illustrating a typical installation of the device;

Fig. 4 is an enlarged fragmentary view, with the cover plate removed, of a portion of the device shown in Fig. 3 with the moving parts shown in one of the intervening positions between defrosting periods;

Fig. 5 is a fragmentary sectional view along the line 5—5 of Fig. 4;

Fig. 6 is a fragmentary sectional view along the line 6—6 of Fig. 5;

Fig. 7 is a view of the device shown in Fig. 3 with a portion of the cover plate removed in which the moving parts are shown in their respective positions at the instant after the defrosting action has been initiated;

Fig. 8 is an enlarged fragmentary view of a portion of the device shown in Fig. 3 with the cover plate removed showing three different relative positions of the parts therein necessary in the control of the defrosting system;

Fig. 9 is a graph showing the effects of ambient temperature on the defrosting period in the present defroster control device;

Fig. 10 is a somewhat diagrammatic fragmentary view of a modified form of my automatic defroster control device in which the defrosting period is initiated by the refrigerator door after a predetermined number of movements thereof, shown installed in relation to a refrigerator door;

Fig. 11 is a somewhat diagrammatic view of another modification of my defroster control device in which the defrosting action is initiated by manual means;

Fig. 12 is a fragmentary view of a modified form of the manual means of Fig. 11;

Fig. 13 is a partial sectional view of a modified form of sensing mechanism for use with any of the foregoing embodiments in which the frost that forms on the evaporator tube is utilized directly as a sensing function; and Fig. 14 is a diagrammatic view of a modified form of sensing mechanism for use with any of the foregoing embodiments in which a closed expandable water container is used as a sensing member.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In accordance with the present invention, I provide an automatic defroster control device for a refrigeration machine in which the detrimental factors of present controls such as high cost, complexity, excessive noise, unreliability, lack of consistency, and variations with air density are eliminated, and which will not melt frozen foods, but will melt substantially all the frost under all operating conditions. I provide such a control device by utilizing thermally-responsive means as a sensing function to control the defrosting period and termination thereof, which means in the forms shown are dependent on the melting of ice. Such thermally-responsive means may take the form of a vessel filled with water and mounted near a portion of the freezer or cooling unit to freeze when the defrosting system is inactive and to melt gradually when the defrosting system is active. In one form of the invention I provide means associated with the vessel to cause a portion of the melted frost from the cooling unit to flow into the vessel for maintaining a desired water level. In this form of sensing means, I provide a sensing member having a portion immersed in the vessel and including means to latch or hold the means that activates the defrosting system, such as an electric switch for example, during the period required for the ice in the vessel to melt a desired amount, which period corresponds to the time required for substantially complete melting of frost from the cooling unit. The latch means may take the form of a lever which engages the switch or a detent or catch connected thereto. I provide means such as a spring to effect a releasing movement of the sensing member as permitted by the melting of ice in the vessel. Means are provided to release the connection of the sensing member with the switch, and such release means may take the form of cam means to cause a releasing movement of the catch or detent which holds the latch means.

I further provide means in my device to initiate the defrosting action, which means effects movement of the detent and/or switch to activate the defrosting means and simultaneously to set the detent to engage the sensing member under the influence of biasing means such as a spring whereby the melting of ice in the vessel can then control the defrosting period. Such initiating means may be automatic, as in several forms of my invention, in which I provide novel counting mechanism having drive means adapted intermittently to actuate the switch and thereby to control the period between defrosting actions. In one of the fully-automatic forms of my invention, I provide means such as a solenoid in the motor-compressor circuit to actuate the counting mechanism each time the motor-compressor unit goes through one cycle. In this form of my invention, the defrosting system is energized after a predetermined number of compressor-cycles. In another of the fully-automatic forms of my invention, I provide means actuated by the door of the refrigerator to operate the counting mechanism. In this form of my invention, the defrosting system is energized after a predetermined number of door openings.

With both of the fully automatic forms of my invention, I provide a novel ratchet-type of counting mechanism wherein the actuating means therefor is adapted to produce short-stroke movements of the ratchet wheel when the defrosting system is inactive, but to produce a long-stroke movement of the ratchet wheel when it is in a position to activate the switch and defrosting system. Such counting mechanism may be in the form of a ratchet member having means to guide same to engage one small ratchet tooth for each movement of the solenoid or door, which movement is of relatively long stroke; but when the defrosting system is activated, the ratchet member follows a path controlled by guide means to engage a single large tooth of the ratchet wheel, whereby the wheel actuates the switch only during such long stroke movements and sets the detent in its temporary locked position to maintain the defrosting action until the frost is all melted from the cooling unit.

In a semi-automatic form of my invention, I provide manually operated means to initiate the defrosting system, which means replaces the counting mechanism and the solenoid or door-operated actuating means therefor. Such novel means may take the form of a manual pushbutton connected by linkage to directly actuate the switch and/or detent merely by depressing the button, whereby the switch is set in its latched position until released by the melting of the ice in the vessel by an amount corresponding to the melting of all the frost from the cooling unit. In all forms of my automatic defroster control device, the ice or frost sensing-system is so arranged to melt sufficiently to inactivate the defrosting system far ahead of the melting of frozen foods but lagging only slightly behind the melting of all the frost from the cooling unit. My control device is thus thermally-responsive in its defrosting action and hence is a function of temperature and time, or heat.

Figure 2:
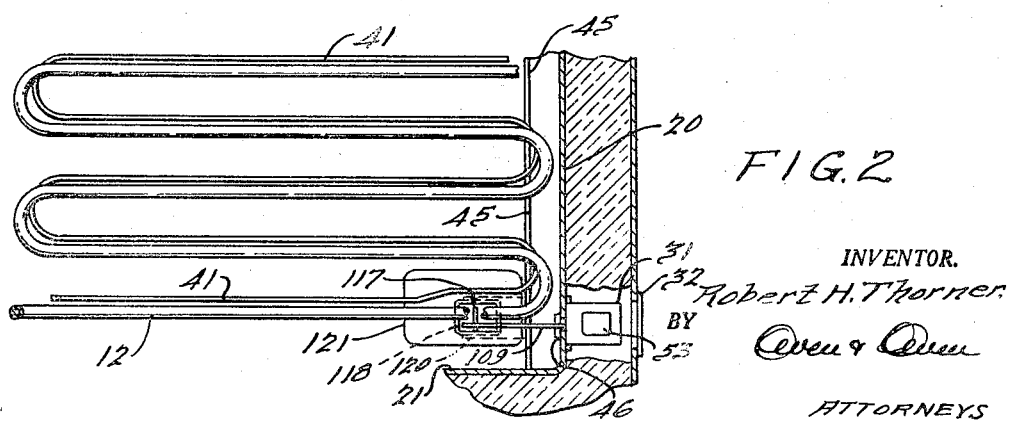
Fig. 2 is a fragmentary sectional view along the line 2—2 of Fig. 1.

Referring now to the drawings and particularly Figs. 1 to 3, there is shown by way of example a typical domestic refrigerator 11 having the present automatic defroster control installed therein. The refrigerator shown is of the type in which only one evaporator coil 12 is used for both a frozen food compartment 13 and a cooling compartment 14 for maintaining perishable foods at temperatures slightly above freezing. The total refrigerator space is formed by a door 15, and upper wall 16, a back wall 20, two side walls 21, and a lower wall 22. This space is divided into two sections having a heat-insulating partition 23 to form chamber 14. Everything above the partition 23 is subjected to temperatures below freezing and everything below the partition 23 is subjected to temperatures above freezing. In this specification, the combination of the evaporator coil and any cooling surfaces connected thereto, such as the walls of the frozen food compartment, will be referred to as the "cooling unit."

The refrigerator system illustrated in Figs. 1 and 2 comprises the motor-compressor unit 24 which pumps a refrigerant or cooling medium such as "Freon," through a condenser coil 25 and tube 26 for transferring the refrigerant to the evaporator coil 12; after the refrigerant expands therein to absorb heat, it returns through a tube 30 to the compressor, and the cycle is repeated. The automatic defroster control 31, which is shown in detail in Fig. 3, is securely mounted to the back wall 20 in the space between the wall and a cover plate 32 through which the control unit is installed. In the electric circuit starting at terminal 33 the wires 34 and 35 are normally connected together by a switch in the control device 31, and wire 35 is led to the motor and to a control switch 37 so that the motor is normally in series with switch 37. This switch is operated in a conventional manner by a temperature element 40 that senses the temperature in the freezing portion of the refrigerator. The switch 37 is normally open, and closes when the temperature rises at element 40 thereby starting the motor-compressor unit until the temperature is returned to its regulated value.

One type of heater element for melting the ice from the evaporator coil 12 is illustrated in Figs. 1 and 2 as element 41. This heater element is electrically connected by a wire 42 to terminal 43 and through wire 44 and a switch (hereinafter described) in the defroster control 31, to wire 34 and the opposite terminal 33. The switch in the defroster control is normally opened so that the heater is turned off during normal operation of the refrigerator. When the defroster control 31 causes the heater element 41 to be activated in a manner to be described, the heater melts the frost from the evaporator coil and from the walls of the frozen food compartment 13. Most of the melted frost falls by gravity on the partition 23 which is sloped so the water flows into a suitable receptacle such as the trough 45 which, in the form shown, extends across the back wall 20. The trough is suitably sloped to direct the water to flow through a single outlet 46 in the bottom of the trough. The water then flows along the back wall 20 (or through an external tube in some systems) and through a drain aperture 50 into a pan 51 where it vaporizes assisted by the heat from the condenser 25. After substantially all the frost is melted, the defroster control automatically inactivates the heater element in a manner to be described. When referring to the evaporator coil or cooling unit in this disclosure, the terms "frost" and "ice" will be used synonymously unless otherwise specified. Actually "frost" is merely ice formed by freezing the moisture condensed from the air.

Referring to Fig. 3 which is an enlarged fragmentary view of the refrigerator and defroster system exemplified in Fig. 1, one embodiment of my defroster control indicated generally at 31 is shown. In this form of the present invention, the defrosting action is initiated in response to a predetermined number of compressor cycles, whereas the very important defrosting period and the termination thereof is controlled by novel ice-sensing means disclosed in all forms of the present invention. Referring specifically to Figs. 1–3, the electric circuit includes any suitable electro-magnet or solenoid such as the solenoid 53 connected to function in parallel with the motor-compressor unit 24 and secured to the housing 54. Thus when the temperature element 40 causes the switch 37 to close, the motor-compressor unit 24 and the solenoid 53 are actuated simultaneously. The solenoid includes a plunger 55 slidable in the core 56; the plunger is formed in any suitable manner such as by laminated pieces of soft iron and is biased downwardly by a spring 57. The plunger is limited on its downward stroke by the casing or stop portion 58 provided therefor.

One of the soft iron laminations of the plunger may have an extension 59 to act as a stop member to limit the upward travel of the plunger in the core when the solenoid is energized. Referring to Figs. 3 and 4, another of the iron laminations may have an extension 60 projecting through an aperture in the housing 54 and connected by a leaf spring 62 to a ratchet member 63 to support and actuate same. The leaf spring 62 is so arranged and installed that its elastic limit will not be exceeded at any time. The ratchet 63 includes a finger 64 disposed at a suitable angle to engage the teeth 66 of a ratchet wheel 67 which is carried by and revolves about a shaft 68. Also the ratchet includes a guide extension 69 having a contoured portion cooperable with a guide pin 70 to control the engagement of the finger 64 with the teeth of the ratchet wheel 67 in effecting counter-clockwise movements thereof. The leaf spring 62 is secured to the extension 60 and ratchet 63 by any suitable means such as by rivets as shown. The leaf spring is pre-bent in its free position to urge the guide extension 69 against the guide pin 70 in all operative positions of the ratchet.

A second guide pin 71 cooperates with the extension 69 in a manner to be discussed. Any suitable pawl means such as a pawl 72 is secured to and supported by a leaf spring 73 which is secured to the housing 54. The leaf spring 72 is pre-bent to urge the pawl against the teeth 66 to prevent clockwise rotation of the ratchet wheel 67. The leaf springs 62 and 72 perform the double functions of a supporting hinge and also of urging the ratchet and pawl, respectively, against the ratchet wheel. If desired, separate hinged members may be used if biased toward the ratchet wheel by separate springs. In the form shown, the ratchet wheel carries a plate member 74 having a single large driving tooth 75 which is engaged by the finger 64 of the ratchet once per revolution of the ratchet wheel; this engagement is illustrated in the position shown in Fig. 3 and is provided to effect a longer movement of the ratchet wheel than that effected by any one of the smaller teeth 66 is a manner and purpose to be explained. A plate member which includes a trigger or driving finger 76 is secured to the ratchet wheel for rotation therewith and is disposed to abut against a detent 77 at a projection 79 thereof once per revolution as in the position shown in Fig. 3. The trigger 76 cooperates with the detent to activate a switch 80. The detent 77 is connected for swingable movements as by a hinge 81 to a switch-actuator arm 82 which is in turn mounted at a hinge support 84 for angular movements with respect to the casing of the device. The detent 77 is urged downwardly by a spring 85 secured at one end to a projection of the arm 82 to cause a cam portion 86 of the detent to ride on a stationary cam member 88 as in the position shown in Fig. 3. The cam member 88 is supported by and secured to a bracket 89 by means of suitable fastening means such as by screws as shown. A pair of slots 90 which are adapted to receive the mounting screws are provided in the cam member 88 to facilitate vertical adjustment thereof for reasons to be discussed.

Any suitable electric switch such as the switch 80 may be employed in the present invention. However, the novel switch shown in Fig. 3 is of a particular type having special advantages in this embodiment of the present invention to be discussed hereinafter. The switch 80 shown in Fig. 3 includes stationary contact members 92 and 93 and a movable contact 96 carried by an arm 95 fixed at one end to a connecting post 94. The switch arm 95 may be made of an suitable leaf spring material such as Phosphor-bronze or stainless steel and is secured to the connecting post 94 for angular movements thereabout. The end of the switch arm carries the movable contact 96 for electrically connecting the post 94 with either of the contacts 92 or 93 depending on the angular position of the switch arm. A hook 97 is secured to the switch arm 95. In its free position, the switch arm is pre-bent to urge the movable contact 96 rightwardly against contact 93. An actuating-finger 98 is secured to the arm 82 and cooperates with the hood 97 to effect actuation of the switch 80 in a manner to be discussed. In the position shown in Fig. 3, the finger 98 abuts leftwardly against the hook 97 under the influence of a spring 99 acting on the arm 82; hence the contact 96 is moved to abut against the contact 92 to act as a leftward stop for the entire assembly of the switch, the arm 82 and the detent 77. The finger 98 may be made of any material not electrically conducting, or it may be electrically insulated from the arm 82.

A lever 101 is supported by a hinge or shaft such as a shaft 102 for rotation thereabout and is disposed to cooperate with the detent. The lever comprises an actuating arm 103, which projects through a slot 104 in the housing 54, and a latch-arm 105 which is engageable at its extremity with a catch portion 106 of the detent 77 in a manner to be described. The lever is urged by a spring 107 in a clockwise direction, as viewed in Fig. 3, against the left end or stop 108 of the slot 104, and the spring 107 is secured to a fixed support such as a tab projection of the bracket 89.

An ice-sensing member 109 is connected to the extremity of the actuating arm 103 by any suitable means such as a pin 110 which is fixed to the arm 103. In the form shown, the sensing member has a slot 112 disposed to cooperate with a peripheral groove (not shown) in the pin 110. The pin carries a spring clip 113 which is disposed to snap into another peripheral groove (not shown) in the pin 110. The spring clip must be sprung together manually from its free position to insert the free end thereof into a slot 114 disposed to receive same whereby the sensing member is always urged leftwardly in relation to the arm 103. Such a construction acts as a hinge at the pin 110 in which all looseness or "play" is eliminated which is desirable for reasons to be discussed. The sensing member project through a slot 115 in the refrigerator wall 20 and, includes a downwardly extending portion or finger 116 having a flange portion 117 which is immersed in a vessel 118 filled with a freezable liquid 119 which, in the form shown is water. The vessel is fixably mounted by suitable fastening means to a bracket 120 secured to the refrigerator wall 20. A baffle or collecting funnel 121 is secured to the top of the vessel as shown, and one or more overflow orifices 122 are provided at a predetermined height in the vessel, all for purposes to be discussed. The vessel is mounted in a position above the insulating partition 23 and at a proper distance from the evaporator coil 12 to be subjected to freezing temperatures when the defrosting element 41 is inactive. In Fig. 3, the vessel is shown by way of example in a position directly below the evaporator coil, for purposes to be described.

During movements of the lever 101, the spring 107 is strong enough at all times to overcome any friction at the shaft 102 and at the hinged connection at the pin 110 as well as the friction of the finger 116 sliding along the bottom of the vessel 118. However, the spring 99 is much stronger and can always overpower the spring 107.

Figs. 4–8 show the device in various operative positions, and hence are numbered to correspond with Figs. 1–3. Fig. 5 shows the parts along section 5—5 of Fig. 4. Referring to Fig. 4, a ratchet wheel assembly is provided which in the form shown includes spacers 133 inserted between the ratchet wheel 67 and the plate 74 and trigger 76, all secured together by fastening means as by rivets 134. The entire assembly is supported by the shaft 68 for rotation thereabout with minimum friction. The assembly is retained on the shaft 68 by any suitable means such as a washer 135 which is clamped against an end shoulder on the shaft by upsetting the end of the shaft, thereby providing proper axial clearance for the assembly. The shaft is secured to the casing 54 by upsetting the opposite end thereof as shown. Referring to Fig. 6 as well as Figs. 4 and 5, the ratchet extension 69 has a stamped projection or guide portion 138 disposed to cooperate with the pin 71 in a manner to be discussed. It can be seen in Figs. 4 and 5 that the trigger 76 is aligned in a plane to strike the detent projection 79 when revolved but to clear the ratchet 63 and its finger 64 and extension 69. Also, it can be seen that the ratchet wheel 67 and driving tooth 75 revolve clear of the detent projection 79. In addition, it is clear that only the smaller teeth 66 of the ratchet wheel 67 engage the pawl 72, whereas the trigger 76 and driving tooth 75 revolve clear of the pawl since they are not in the same plane at any point thereof. Also it can be seen that the ratchet 63 and its extension 69 completely clear the arm 82 as well as a spring retainer 137 secured thereto. It is further evident from Figs. 4 and 5 that the finger 64 is wide enough and so disposed to engage either the teeth 66 of the ratchet wheel or the driving tooth 75 depending on the rotary position of the ratchet wheel assembly.

In Fig. 4 the ratchet 63 is shown in approximately its mid-position of travel while causing the ratchet wheel to revolve, and the pawl 72 is shown riding over one tooth to the next tooth. The finger 64 of the ratchet 63 is also shown in its extreme travel-positions at 64a and 64b. It is apparent that the solenoid plunger 55 and ratchet 63 are disposed to travel much further than necessary to effect movement of a single small tooth 66. However, the cam or contoured portion of the guide extension 69 is caused to abut against the pin 70 by the force of the leaf spring 62 which, in turn, causes the end of the finger 64 to follow a locus or pattern shown dotted as 64c. The contour of the guide extenison is worked out as shown by the locus 64c so that the finger 64 can contact the teeth 66 for a distance corresponding to more than one but less than two teeth. In this manner the finger 64 "dips into" the teeth of the ratchet wheel 67 to effect movement of the wheel corresponding to only one tooth-length of the teeth 66 although each stroke of the solenoid and ratchet is greater than the movement for one tooth by any desired amount.

Operation

Referring now to Figs. 1–8, each time the switch 37 is closed by the temperature element 40 during the time interval between defrosting periods, the compressor proceeds through one cycle and the ratchet wheel is moved one tooth by the solenoid 53 and ratchet 63 as shown best in Fig. 4. Hence it requires a number of compressor cycles equal to the number of the teeth on the ratchet wheel to effect one complete revolution of the trigger 76 before it engages the projection 79 of the detent 77. In Fig. 3, the detent and switch parts are shown in the position wherein the detent 77 is urged to its leftward stop position by the spring 99, and it will be seen that the switch 80 is operated by the ratchet wheel only once per revolution thereof. While the ratchet wheel is making one revolution, the heater circuit is inactive since the contact 93 for the heater branch wire 44 is disconnected from the contact 94 which is connected to the line terminal 33.

It is significant that the frost that forms when the refrigerator door is closed is generally a function of the number of times the temperature in the refrigerator is restored, or a function of the number of the compressor cycles. In addition, each time the door is opened, fresh moisture-laden air replaces a part of the air in the refrigerator; hence the formation of frost is also generally a function of the number of door openings combined with the foregoing factors. Each time the door is opened, the temperature in the refrigerator increases, so that usually the motor-compressor unit is activated by the switch 37. Thus the amount of frost that forms on the cooling unit is generally a function of the number of compressor cycles. The number of teeth 66 on the ratchet wheel 67 is selected to cause one complete revolution thereof for any desired formation of frost, such as the amount normally formed during a twenty four hour period, for example. It will be assumed by way of example for discussion herein that fifty teeth are required although any suitable number may be used.

After one revolution of the ratchet wheel in the manner described above, the ratchet wheel assembly reaches the position shown in Fig. 8 wherein the trigger 76 is adjacent to but not touching the projection 79 of the detent 77. When the switch 37 opens after causing the ratchet wheel to be moved to the position shown in Fig. 8, the spring 57 urges the solenoid plunger 55 and ratchet 63 downwardly whereby the finger 64 must ride over the driving tooth 75; this over-riding position is shown in Fig. 8, while the ratchet wheel assembly is held from reverse rotation by the pawl 72. When the plunger 55 reaches the lower end of its travel, the finger 64 passes the driving tooth and snaps into engagement therewith so that all parts are then as shown in Fig. 3, and the device is ready to "fire" at the next compressor cycle.

The next time the refrigerator temperature increases to cause the switch 37 to close, the solenoid circuit is closed and the plunger 55 moves the ratchet 63 upwardly which pulls the driving tooth 75 and ratchet wheel assembly into the position shown in Fig. 7. The locus 64c of the finger 64 shown in Fig. 4 causes same to engage the driving tooth 75 during the entire stroke of the plunger 55, not just part of the stroke as for the teeth 66 as explained. This is clearly shown in Fig. 8 by the dotted or phantom view of the finger at 64d in relation to the corresponding phantom view of the driving tooth at 75d before the upward stroke of the plunger is completed; at this time the trigger 76 has pushed the catch projection 79 to move the detent 77 into the position shown in dotted lines at 77d (Fig. 8) in which the catch 106 is moved to the dotted line position 106d almost past the end of the latch arm 105. At this time, the purpose of the guide portion 138 of the ratchet 63 and the pin 71 can be understood. Referring to Fig. 8, the driving tooth at 75d contacts the finger at 64d at an angle whereby the finger is subjected to its maximum reacting contact force since the spring 99 is compressed. This force tends to move the finger 64 to the right and out of engagement with the tooth 75. However, the guide portion 138 abuts against the pin 71 as shown in the position 138d, thereby maintaining engagement of the tooth and finger. The guide portion 138 is contoured so as not to interfere with any other movements of the ratchet 63.

When the plunger 55 completes its upward stroke, the detent 77 is moved further to the right whereby the catch 106 passes the latch arm 105 so that the spring 85 pulls the detent downwardly into the position shown in Fig. 7. Movement of the detent to the right also moves the arm 82 which compresses the spring 99. At the first portion of the total rightward travel of the detent, the actuating finger 98 carries with it the hook 97 since the switch arm 95 urges the movable contact 96 to move rapidly against the contact 93, thereby energizing the circuit to the heater element 41.

At this time and under the assumed conditions, the water 119 in the vessel 118 is frozen solid since approximately twenty four hours have elapsed since the last defrosting action; but the ice 119 starts to melt when the ambient temperature rises above the freezing point under the influence of the heater 41. Hence, referring to Figs. 3 and 7, the spring 99 urges the arm 82 and detent 77 to act on the latch arm 105 in a counterclockwise direction which tends to move the actuating arm 103 and sensing member 109 rightwardly as viewed in Fig. 3. This movement is resisted by the ice in the vessel 118 contacting the flange 117 of the finger 116. Since the ice melts first at the finger and also where the ice contacts the surfaces of the vessel, the distance between the flange 117 and the right side of the vessel gradually diminishes as the ice melts; thus the sensing member gradually moves to the right since it is held against the remaining solid ice under the influence of the spring 99 which overpowers the spring 107 (not visible in Fig. 7) to cause the detent 77 and arm 105 gradually to move leftwardly as permitted by the melting ice. As the detent moves leftwardly from the position shown in Fig. 7, the cam portion 86 thereof engages the cam member 88 as shown best in Figs. 7 and 8; and further movement of the detent as the ice continues to melt causes the detent to be moved upwardly by the cooperative action of the cam portion 86 and the cam 88.

When the detent reaches the position 77b shown in Fig. 8 wherein the latch arm is at the position 105b, the slightest additional melting of the ice causes the catch 106 to release from the latch arm 105 thereby causing two simultaneous actions as follows: One action is that the lever 101 is rapidly revolved in a clockwise direction by the spring 107 until the actuating arm 103 abuts against the stop 108 whereby the sensing member 109 is returned to the position shown in Fig. 3. As previously explained, the spring clip 113 holds the member 109 to the left against the pin 110; thus when the finger 116 freezes in the vessel, there is no "play" between the finger and the latch arm 105 when it is engaged by the catch 106 at the next following defrosting period. The second action is that the spring 99 causes the arm 82, the actuating finger 98, and the detent all to return rapidly into the position shown in Figs. 3 and 8 wherein the projection 79 is behind and clear of the trigger 76 which then must make one complete revolution to re-engage the projection 79.

During the last portion of this second action the finger 98 abuttingly engages the hook 97 which instantly moves the contact 96 away from the contact 93, thereby inactivating the heater element 41. The installation and design of the ice-sensing member and the vessel 119 are worked out so that all the frost is melted from the cooling unit before the heater element is inactivated which will be discussed further. At this time the ratchet wheel assembly, the plunger, and the ratchet 63 are in the position shown in Fig. 7 and the switch 37 is closed because of the elevated temperature in the refrigerator. After the heater element has been turned off, the compressor can lower the temperature to the normal controlled freezing value established by the sensing element 40. At this temperature the switch 37 opens which turns off the compressor and simultaneously permits the spring 57 to move the plunger 55 and the ratchet 63 downwardly to the position shown in Fig. 3 while the ratchet wheel assembly is held in the position shown in Fig. 7 by the pawl 72 so that one complete defrosting cycle has ended. Then, at each following compressor cycle, the ratchet wheel assembly is moved one tooth-distance such as for the tooth 66, as shown and described in relation to Fig. 4, until after the predetermined number of compressor cycles (fifty in the assumed example), the defrosting action is again repeated as described.

An axially moving member may be used in place of the lever 101 to provide direct actuation of the sensing member 109. However, the use of a pivoted lever permits any desired ratio of the movement of the detent to the movement of the sensing member 109. Also, the latch arm 105 is revolving to the left and downwardly while the catch 106 is moving upwardly which is desirable from a mechanical standpoint to give a more sudden release.

The purpose of providing a working stroke of the solenoid plunger 55 longer than the movement of one tooth such as 66 and of providing a single large driving tooth can now be explained. In order to provide a large number of teeth such as fifty within practical space limitations, each tooth must be relatively small. If the trigger 76 only moved the detent 77 an amount corresponding to one such tooth-distance from the position shown in Fig. 3, it would start the defroster heater 41 but the detent would not have moved enough to be transferred to the latch arm 105. In this instance, the defroster heater would not be inactivated even after the frost melts from the cooling unit as explained above, because the detent would bear against the trigger 76 instead of the arm 105. Hence the trigger 76 must move the detent far enough not only to actuate the switch 80 and energize the defroster, but also the catch 106 of the detent must simultaneously be moved past the latch arm 105 on the same stroke. A further requirement in this respect is that the switch 80 must be returned to its original position only during the last portion of the return or leftward stroke of the detent after it is released from the latch arm 105 as a result of the melting of the ice in the vessel 118. In other words the defroster heater must be inactivated only when the detent is between the release position thereof at 77d in Fig. 8 and its free position there shown. If the defroster heater is inactivated at any position of the detent to the right of the position at 77d, obviously the ice in the vessel would immediately stop melting and the water therein would refreeze. Then the detent would never be released so that the device would probably be rendered inoperative thereafter in a position similar to that shown in Fig. 7, since the trigger 76 could not engage the projection 79. Also there would be no consistency of the defrosting period if the defroster were inactivated before the detent is released.

It might be possible to use short-stroke movements of the ratchet 63 corresponding to the teeth such as 66 if the total travel of the detent is correspondingly reduced. However, such short-stroke movements would be undesirable since the angles of the cam portion 86 and the cam 88 must be steeper to provide the necessary rise in a shorter distance. This increased angle is undesirable from a mechanical standpoint and also would increase the sensitivity of the adjustment. Thus from a mechanical standpoint it is obviously desirable to provide a longer detent travel with a shallow cam-angle. Therefore, in order to provide for movements of the switch 80 in its proper part of the cycle and also to provide consistency in calibration of the instrument it appears, that such short-stroke movements might necessitate precision production to an extent which might result in a prohibitive manufacturing cost.

Referring again to the defrosting cycle described above the vessel 118 is maintained full of water in view of evaporation losses in a novel manner. Referring to Figs. 1 and 3, when the heater element 41 is activated some of the melted frost falls by gravity into the baffle or funnel 121 secured to the vessel as shown, and the melted frost flows into the vessel 118. The excess water then overflows from the vessel through the orifices 122 to the partition 23 where the water flows to the trough 45 and is disposed of as previously explained. If desired, the vessel 118 might be suitably mounted on the side of the freezer compartment 13 with baffles mounted on the side thereof to direct the flow of water to the vessel. The vessel is preferably mounted to be accessible from the front of the refrigerator so that it can be initially filled with water so that the defroster will operate when the refrigerator is first installed. The particular location of the vessel in addition to other factors is important in calibrating the device in a manner to be discussed in relation to Fig. 9. It should thus be understood that the particular form and location of the vessel 118 shown in the drawing is merely illustrative to set forth the principle.

The switch 80 shown in Fig. 3 has particular utility in the combination of elements comprising the defroster control device shown in Figs. 1–8. The switch as disclosed does not produce a "snap-action" by itself, but the "snap-movements" inherent in the control device mechanism itself is utilized to produce the desired rapid excursion in the switch 80 to prevent burning of the contact points. In the embodiment shown in Fig. 3, the action of the plunger 55 is extremely fast in moving the detent 77, the arm 82, and the finger 98, so that the movable contact 96 in effect "snaps" from the contact 92 to the contact 93. Also, when the detent releases from the latch arm 105, the spring 99 causes an extremely fast return movement of the arm 82 and finger 98 which engages the hook 97 at the very end of this fast return movement as previously explained; thus the movement of the contact 96 from the contact 93 to the contact 92 in effect is also a "snap-action."

Another important and useful feature of the switch 80 is that the defroster element is inactivated inherently at the very end of the leftward travel of the detent 77, as viewed in Fig. 3. For reasons explained above, it is important that the defroster element be inactivated after the detent has been released from the latch arm 105.

If desired, the solenoid may be arranged to have the plunger 55 move downwardly instead of upwardly as viewed in Fig. 3 when the solenoid is energized by closing the switch 37; in this instance the spring 57 would be arranged to bias the solenoid upwardly when the switch 37 is opened. In this arrangement, the solenoid biasing spring must be strong enough to perform the work of moving the detent and arm 82 to actuate the switch 80, thereby overpowering the spring 99; whereas the spring 57 in the forms shown may be of relatively low force since it only moves the ratchet 63 downwardly. Such an arrangement would cause the ratchet to move the ratchet wheel each time the switch 37 is opened, which is the reverse of the arrangement shown in Fig. 3.

Fig. 9 is a graph showing the results of actual tests of my invention and how it is thermally sensitive. The graph represents the variation of the time required for the detent to travel from the position shown in Fig. 7 to the release position at 77b in Fig. 8 at various constant ambient temperatures surrounding the vessel 118 when filled with ice. In actual operation in a refrigerator, the vessel is subjected to varying temperatures rather than constant temperatures after the heater element is energized; but, the curves in Fig. 9 show the thermal function of the device and clearly indicate how the device responds in actual operation. The curve E—A was run with the vessel completely filled with ice, whereas the curve M—N was run with the same vessel only 32% filled with ice. Obviously, the curves will be asymtotic with respect to the 32° F. line and also to the ordinate. The ambient temperature at the vessel may be calibrated to be different from the temperatures in the freezer compartment or at the evaporator coil; accordingly a portion of the heater element may be located in relation to the vessel for providing the correct heat such that all the frost melts from the cooling unit without melting frozen foods that may be stored in the low temperature compartment 13.

From these curves shown in Fig. 9 it can be seen how the present invention actually functions as a defroster control. The total time required for the detent 77 to release, or the defrosting time, may be considered to be comprised of two time periods or intervals. The first period is the time required for the heater element to raise the ambient temperature surrounding the vessel 118 to the melting temperature of 32° F. The second period is the time required for the heater element to raise the ambient temperature above 32° F. to melt the ice sufficiently in the vessel for the detent to be released. When the heater element 41 is energized, the ambient temperature at all points in the refrigerator rises more slowly with a large frost formation on the evaporator coil than with a small frost formation thereon. Hence both of the foregoing time periods are longer with a large frost formation than with a small frost formation which, of course, is functionally correct. This characteristic is one of the main features of the present invention, since the device can be calibrated correctly so that the heater element is inactivated after all the frost is melted from the evaporator coil for both extremes of a large or small formation of frost.

Obviously the curves shown in Fig. 9 only apply to the second time period when the ambient temperatures are above freezing. The variables affecting the slope and shape of these curves are utilized when initially engineering the installation of the present invention in each design of refrigerator so that the defrosting period is correct under all conditions. Accordingly, at the worst extreme condition in which a heavy coating of frost covers the cooling unit, the variables affecting the defrosting period are arranged so that all the frost is melted just before the heater element is inactivated; also, at the other extreme condition when the smallest coating of ice covers the cooling unit, the same arrangement of these variables will again cause all the ice to be melted just before the heater element is inactivated.

Referring to Figs. 1 and 3, the influence of these variable factors in the initial engineering or calibration of a particular installation of the present defroster control invention will now be considered. One of the main purposes for removing the frost from the evaporator unit, as explained previously, is that the frost acts as an insulator to retard the transfer of heat from the food compartments to the refrigerant. This same detrimental effect may be utilized to great advantage with the present control device. For example, assuming that a "hot-gas" type of defroster system is being used wherein the refrigerant is heated by suitable means, the hot refrigerant is circulated by the compressor to melt the frost from the cooling unit. It can be seen in Fig. 3 that in order to melt the ice in the vessel 118, the heat from the refrigerant must pass through the coating of ice on the coil 12 before the heat reaches the vessel 118. Since this coating of ice acts as an insulator, a heavy coating prevents the full heat from the refrigerant to be transferred to the vessel so that the ice 119 therein requires a longer time to melt. This effect is desirable since it causes a longer defrosting period which is necessary to melt the heavier coating of ice. Equally important, however, as the ice on the evaporator coil gradually melts, the heat from the refrigerant gradually is more easily transferred to the vessel to accelerate gradually the melting rate of the ice 119 therein. One factor in achieving the desired characteristics is to install the vessel 118 at the proper distance from the cooling unit and at the proper location in relation thereto since the frost forms in different amounts at different points on the evaporator unit. The defrosting period will be shorter if the vessel is closer to the cooling unit (when heated), and conversely. If desired, in addition to the heat insulating effect of the frost, a wall or spacer made of heat-insulating material might be inserted between the evaporator unit and the vessel; this would give a very long defrosting period, but in most instances it appears not to be necessary.

In the type of defroster system illustrated in Figs. 1 and 3 in which an external heater element 41 is used, the location of a portion of the heater element in relation to the vessel may be a controlling factor. If it is desired to reduce the defrosting period during which the heater element 41 is energized, a portion of the heater element is located closer to the vessel than if a longer defrosting period is desired. Also, another factor in the calibration of the present defroster control invention is the quantity of heat added by the heater element 41 or its equivalent.

All the above variables affect both the aforementioned two time periods. The following are variables that only affect the second time period after the temperature rises above 32° F., and hence affects the shape and/or slope of the curves shown in Fig. 9. As previously explained, the ice in the vessel 118 does not melt entirely, but it melts primarily at the contact with the flange 117 and the wall of the vessel 118; the ice may be considered as either an ice-connection, or ice-spacer, or ice-link between the fixed wall of the vessel and the flange 117 of the sensing member. Since the ice in vessel 118 is exposed or open to the atmosphere and the finger 116 is immersed or embedded in the surrounding ice, the expansion and contraction of the ice as it freezes and melts, respectively, has no adverse effects on the operation of the device. Thus the linkage mechanism which operatively connects the switch 80 with the wall of the fixed vessel 118 during the defrosting period may be considered to include an "ice-link" portion which varies in length in accordance with changes in temperature and time, and hence is thermally responsive in releasing the detent 77 and switch 80 as a function of both temperature and time.

If both the finger 116 of the sensing member and the vessel are made of heat-conducting material such as metal, the defrosting time will be shorter and the curves in Fig. 9 will be lower. If both the sensing member and vessel are made of heat insulating material such as plastic, then the defrosting time will be longer and the curves in Fig. 9 will be higher. The curves shown in Fig. 9 were run with a metal sensing member 109 and a plastic water vessel. The width and/or depth of the water in the vessel may be varied to vary the defrosting period; the curves in Fig. 9, as explained above, show the difference in the depth of the water in the vessel 118. Also, the ratio of the lengths of the lever arms 103 and 105 can affect the curves in Fig. 9. If the arm 103 is longer than the arm 105, the defrosting period will be longer than the reverse relationship.

Also the size of the baffle 121 or the amount of melted frost directed through the vessel will affect both portions of the total defrosting period; the period is shorter with a larger amount of melted frost flowing through the vessel so that this factor also can be used in the initial calibration of the device. From an evaporation standpoint, only a few drops of water occasionally are necessary since the ice in the vessel is frozen solid most of the time; hence the effect on the defrosting period will usually be the deciding factor in this respect.

Since the melting function of the ice in the vessel is the same as the melting function of the frozen foods as well as the frost, the variables discussed above may be arranged to cause the ice sensing member to move enough during the defrosting period to precede the melting of frozen foods but follow slightly the melting of frost from the cooling unit.

Thus, any desired combination of the foregoing factors may be used. For example, the water level in the vessel may be higher with a small flow of melted frost therethrough, or a lower water level may be used in the vessel with a smaller flow of melted frost therethrough. After the calibration is worked out, the present novel defroster control lends itself to consistency or duplication in production; this is an extremely important problem in providing a useful defroster control instrument, and many of the prior art devices fail in this respect. Referring to Fig. 3, the space between the contacts 92 and 93 may be set by a thickness gauge as by bending the contact 92. With the ratchet wheel assembly in the position shown in Fig. 3, the detent 77 may then be set adjacent to but not touching the trigger 76 by bending the finger 98. The cam 88 then may be adjusted and set in its vertical position to control the point of release of the detent 77 to provide the same calibrated defrosting period for all production units. In this regard, an extremely important feature of the present invention is that the thermal sensing function is inherently consistent in production units because the melting point of the pure condensed water is always precisely 0° C.

Thus my thermally-responsive defroster control device can be worked out so that under all conditions the defrosting period is correct, since the melting function of the ice in the vessel is the same as the melting function of the frozen foods as well as for the frost or ice covering the cooling unit. Accordingly the variables are worked out so that the melting of the ice in the vessel 118 is well "ahead" of the melting of the frozen foods, but slightly "behind" the melting of the frost from the evaporator unit. It is apparent that the present defroster control is of extremely simple construction, very reliable, free of noise, independent of air density effects, and can be made to give consistent calibrations or uniformity in production units. In addition its inherent simplicity lends itself to extremely low cost production and simple installation.

Fig. 10 shows a modified form of the present invention in which the heater element is activated by the movement of the door 15 after a predetermined number of door openings, but the duration of the defrosting period and termination thereof is accomplished in the same manner and with the same mechanism as disclosed and described for Figs. 1–8. The only difference in the mechanism of the form of the invention shown in Fig. 10 is that a door-actuated mechanism is used in place of the solenoid 53 to actuate the ratchet 63; and also any suitable switch having built-in snap-action characteristics is shown in place of the switch 80 as in the form shown in Fig. 3. The device is shown installed differently from the form in Fig. 3, as will be explained. The parts and mechanism of Fig. 10 which are the same as in Fig. 3 are so indicated with the same numerals as in Fig. 3.

Referring to Fig. 10, a cylindrical guide housing 140 is secured to the main housing 54 by suitable means as by rivets. The guide housing includes a closed end portion 141 suitably slotted to receive and guide a rectangular shaft 142 at one end therof. A guide member 143 is secured inside the guide housing as by press-fitting thereto. The guide member also includes a slot to receive and guide the other end of the shaft 142 at a distance from the end portion 141. A spring retainer 146 is secured by suitable fastening means to the shaft 142 to effect rightward movements thereof under the influence of a heavy spring 147 retained at its fixed end by a washer 148 which bears against a step portion in the housing 140 as shown. At one extremity the shaft carries a pin 149 and an actuating member 150 having slots 153 therein adapted to receive and be guided by the pin. A strong spring 154 which can overpower the spring 147 is inserted between the retainer 146 and a flange of the actuating member 150 to urge the latter rightwardly in relation to the shaft 142. The other extremity of the shaft is connected by the leaf spring 62 to the ratchet 63 as in the forms shown in Figs. 3–8.

The control device is shown in Fig. 10 installed in the upper section of the refrigerator secured to the top outer wall 155. Fig. 10 is shown as viewed from the other side of the refrigerator shown in Fig. 1 wherein the door 15 appears on the right side rather than on the left side as in Fig. 3. The water-filled vessel 118 is mounted at any suitable place to receive the plate 156 of the sensing member 109 and where it can collect melted frost for maintaining its water level in the same manner as previously explained. In this form of the present invention, the member 109 is shown to be moved vertically by the arm 103. The spring clip 113 in this instance is made to squeeze together in its free position so that the free end can be inserted in the slot 114 for holding the member 109 against the pin 110 in the slotted portion 157 to take up all "play" in the connection, as before. A support 158 for the ice holding vessel is secured to any suitable fixed surface or member in the refrigerator. The control device is installed so that the pin 149 is approximately central in the slots 153 when the door 15 is closed for reasons to be explained.

A typical switch having built in snap-action characteristics is shown in the form of the invention disclosed in Fig. 10. In the particular snap switch exemplified therein, the finger 161 moves the left end of the leaf spring member 162 in relation to an arc portion 163 struck through the leaf spring as shown. When the arm 82 is moved downwardly as viewed in Fig. 10, the finger 161 raises the left end of the leaf spring 162 above the left end of the arced portion to cause the contact 96 to snap from the contact 92 to the contact 93. Because of the reverse action of this switch from the switch 80 in the form shown in Fig. 3, the contacts 92 and 93 are reversed; but these contacts as well as the electric circuit are shown and numbered to be the same as in Fig. 3. Any snap-switch as shown in Fig. 10 must be calibrated to "snap" the point 96 from the contact 92 to the contact 93 after the detent 77 has released from the latch arm 105 for the same reasons as explained in relation to Fig. 3.

The control device shown in Fig. 10 operates as follows: When the door 15 is opened, the springs 147 and 154 expand. Since the spring 147 is strong enough to overpower the spring 99, the expansion of spring 147 moves the shaft 142 and the ratchet 63 rightwardly as viewed in Fig. 10. The stroke length of the shaft is the same as the long-stroke of the solenoid plunger in Fig. 3. This action causes the trigger 76 to move the detent 77 and the switch arm 82 downwardly, as viewed in Fig. 10, to activate the heater and to set the detent in the position shown in Fig. 7 in the same manner as in the form shown in Figs. 3-8. When the door is moved toward its closed position, the member 150 acts first to compress the member 147 since it is always overpowered by the stronger spring 154 to return the shaft and ratchet to the position shown in Fig. 10. After the shaft and ratchet reach the end of their travel when the retainer 146 abuts against the end portion 141, the door is still slightly open. As the door closes completely, it slightly compresses the very strong spring 154 whereby the member 150 is in the position shown. The member 150, the pin 149, the slots 153, and spring 154 are provided so that the control device may be installed in production without requiring a precision relationship between the door 15 and the ratchet 63; thus a variation in the horizontal location of the control device of about 1/16" or more, for example, can be tolerated in production.

Each time the door is opened and closed in the foregoing manner, it produces the same action as did each movement of the solenoid 53 in Figs. 3-8. After a predetermined number of door openings depending on the number of teeth of the ratchet wheel 67, the defrosting cycle is repeated in which the defroster is activated and inactivated in the same manner as for the form of the invention shown in Figs. 3-8. However the member 156, which corresponds to the flange 117 of Fig. 3, moves vertically downward tending to compress the ice 119 rather than horizontally although either form of sensing means may be used in any form of the present invention.

In the form of the invention shown in Fig. 10, the formation of frost is generally a function of the number of door openings since fresh moisture-laden air enters the refrigerator each time the door is opened. Hence, if it is desired to defrost the refrigerator about once per day, the ratchet wheel is made with a suitable number of teeth, such as fifty or sixty for example, so that the defroster will operate as desired. However, when the refrigerator door remains closed for periods extending over several days or even several weeks, the defroster will not function to melt the frost that forms therein. But the form of the defroster control shown in Figs. 3-8 would operate as required since the motor-compressor unit will cycle each time the temperature in the refrigerator rises above the controlled temperatures due to radiation losses through the walls thereof although the door is closed. However, in some instances the form shown in Fig. 10 could lend itself to lower cost manufacture.

Fig. 11 shows a third embodiment of the present invention which is semi-automatic and in which the defrosting cycle is initiated manually but is terminated automatically by the thermal-sensing means in the same manner as disclosed in Figs. 3-10. Referring to Fig. 11 many of the elements therein are the same as in the forms shown in Figs. 3-8 and 10 and are numbered accordingly. One modification is that the projection 79 of Fig. 3 is unnecessary in the form shown in Fig. 11. The control device of Fig. 11 is mounted at any suitable position in a front wall 164 of the refrigerator. The wall 164 has a recessed well 165 having an aperture 166 therein disposed for clearance of a push-button 168 secured to a link 169 which is loosely connected to the switch arm 82 at the freely-fitting hinge 170. The hinge 170 is secured to the supporting member 171 which is part of the switch arm 82. The link 169 projects with ample clearance through a slot 172 in the housing 54. It is desirable to have sufficient clearances at the apertures 166 and 172 as well as at the hinge 170 to reduce friction in the movements of the link and push-button during leftwardly movements of the switch arm 82 and detent 77. Such friction can be completely eliminated as shown in Fig. 12 if desired.

Referring to Fig. 12, the link 169 is supported by a separate guide member 174 secured to the housing 54 and having a suitable slot therein disposed for guiding the link to abut against the switch arm 82. When the button 168 is depressed it causes rightward movements of the arm 82 until it is held by the detent catching on the latch arm (not visible in Fig. 12). The link is then returned by a separate spring 175 inserted between the guide member 174 and a projection 176 of the link, which projection also serves as a leftward stop for the link. Thus when the arm 82 and detent 77 move leftwardly as viewed in Fig. 12, they will have no mechanical connection with the link 169. In the forms shown in Figs. 11 or 12, the vessel 118 is installed at any suitable place in the front of the refrigerator such as at the side of the freezer compartment. The sensing member 109 also may be of any type and installed as required such as from the top as in Fig. 10, or as shown in Fig. 11 in which the sensing member would move through a suitable aperture provided in the side wall of the refrigerator. The electric circuits (not shown in Figs. 11 or 12) are the same as for the previous forms. A snap-switch such as shown in Fig. 10 is suitable for the same reasons as for the form shown in Fig. 10. For remote installations in this or any form of the present invention, a flexible shaft may be used in place of the members 109 in Figs. 3 or 10 if desired.

The control device shown in Figs. 11 and 12 causes the heater element to be activated when the button 168 is depressed manually whenever a sufficient coating of ice forms on the evaporator unit. This action moves the arm 82 to activate the switch (not visible in Fig. 12) which energizes the heater element while the detent engages the latch arm 105 as before. The control of the defrosting period and the inactivation of the heater element is unchanged from the forms shown in Figs. 3 and 10. Although this form of the present invention is semi-automatic, it obviously is extremely simple thus lending itself to very low manufacturing cost with excellent reliability.

Fig. 13 shows another form of sensing means wherein the formation of the frost itself on the evaporator coil directly provides the ice for the sensing function, and hence might be termed a "frost-sensing" member. Referring to Fig. 13, a tube of the evaporator coil 12, shown enlarged, has secured thereto one or more ring-like stop members 179 or similar fixed projections. The sensing member 180 includes a casing 181 which is slidable with respect to the tube 12. The casing may be made of half sections 182 and 183 secured together by suitable means as by screws 185 to form space between the casing and tube 12. One or more half-circular force-transmitting members 186 and 187 are secured to the upper and lower sections, respectively, by suitable means such as by soldering or brazing, and the members 186 are aligned with respect to the members 187 to form in effect a complete circular ring. A support 188 is secured by any suitable means to one of the half sections as shown and carries a hinge-pin 189 secured thereto. A link 191 has a slotted portion 192 adapted to cooperate with a peripheral groove (not shown) in the pin 189. The other end of the link 191 is connected to the arm 103 of any of the foregoing forms of the defroster control 31 by suitable means such as by freely-moving hinge rivet 194. A spring 195 connects the support 188 with a fixed spring hook 197 to take up play in the connections for reasons discussed above.

In the form shown in Fig. 13, the casing 180 has a plurality of small holes 198 to permit air to enter the space between the casing and tube. After frost forms on the tube, the control device 31 actuates the heater element in the manner previously described. As before, the detent 77 (not shown in Fig. 13) urges the arm 103 rightwardly thereby urging the casing and the force transmitting link 191 to move in a rightwardly direction. Such movement is restrained by the frost secured to the tube 12 holding the members 186; and the frost itself is prevented from sliding by the stop members 179. After the frost melts sufficiently, the arm 103 travels far enough so that the detent is released which inactivates the defroster in the same manner as for the other forms of the device. When the frost melts in the space between the casing and tube, it flows out the holes 198 to the partition 23 and to the trough 45, where it is disposed of as previously explained. The sensing member 180 is located at a point on the evaporator coil which normally is the last to melt; hence when the heater element is inactivated, all the frost is melted. If desired, the lower half of the casing may be omitted.

The form of sensing means shown in Fig. 13 can be made partially like the forms shown in Fig. 3 by deleting the holes 198 from only the lower half section 183 of the casing. Then the frost forms primarily in the upper space between the casing and tube whereas water is retained in the lower space between the casing and tube. When the heater element is inactivated, the water in the lower space freezes while frost again forms in the upper portion, so that the defrosting period depends on both the melting of the new frost which forms in the upper portion and the melting of the ice in the lower portion.

Fig. 14 shows another form of ice-sensing means in which the sensing water is enclosed and sealed. This form of ice-sensing may be advantageous in some refrigerators requiring a more remote installation of the sensing means. Referring to Fig. 14, the arm 103 of any form of the control device 31 actuates a diaphragm 200 by means of a lever 201. The diaphragm encloses a fixed casing 202 to form a chamber 203 which communicates by a tube 206 with a metal or synthetic rubber bellows or diaphragm 207. The bellows has its right end fixed and secured adjacent to a portion of the evaporator tube 12 by a fixed support 208, whereas the left end of the bellows is free to move. The total space formed by the chamber 203, the tubing 206, and the interior of the bellows 207 is filled with water. The arm 103 can actuate the bellows freely when the water is melted, but is constrained from movement when the water in the bellows is frozen. When the heater element is activated, the arm 103 which holds the switch (not shown) gradually moves rightwardly as the ice in the bellows gradually melts whereby the bellows contracts. After the arm moves far enough, the heater element is inactivated as before, and the arm 103 is returned to the position shown causing the bellows to expand back to its initial position, and the water therein freezes again whereby the cycle is repeated.

I am aware that the invention may be embodied in other specific forms without departing from the spirit or essential attributes thereof, and I therefore desire the present embodiments to be considered in all respects as illustrative and not restrictive, and that only such limitations shall be placed thereupon as are specifically set forth in the appended claims.

What I claim is:

1. In a defroster control device for a refrigerating machine having a cooling unit including normally inactive defrosting means to effect a melting of frost forming on said cooling unit, the combination of movable control means to regulate the defrosting action of said defrosting means, activating means cooperating with said control means to effect movement thereof to initiate the defrosting action, said control means including detent means movable therewith and including force producing means tending to return said control means to a position for inactivating the defrosting action, movable force transmitting means disposed for connection with said detent means upon initiation of said defrosting action for transmitting forces received from said control means and said detent means, a body of frozen liquid associated with a fixed part of said refrigerating machine near said cooling unit and subject to the freezing action thereof, said movable force transmitting means including a movable member having a portion thereof immersed within said frozen liquid body and held in position thereby to sustain said defrosting action while connected to said detent means, said movable member tending to compress said frozen liquid between said immersed portion of said member and said fixed part under the influence of said forces transmitted by said force transmitting means to form a thermally varying frozen liquid link between said member and said part to sustain said defrosting action, said frozen liquid link gradually reducing in length to a predetermined amount as said frozen liquid gradually melts at which amount substantially all said frost formed on said cooling unit has melted.

2. In a defroster control device for a refrigerating machine having a cooling unit including normally inactive defrosting means to effect a melting of frost forming on said cooling unit, the combination of movable control means to regulate the defrosting action of said defrosting means, actuating means cooperating with said control means to effect movement thereof to initiate the defrosting action, said control means including detent means movable therewith and including force producing means tending to return said control means to a position for inactivating the defrosting action, movable force transmitting means disposed for connection with said detent means upon initiation of said defrosting action for transmitting forces received from said control means and said detent means, a body of frozen liquid associated with a fixed part of said refrigerating machine near said cooling unit and subject to the freezing action thereof, said movable force transmitting means including a movable member having a portion thereof immersed within said frozen liquid body and held in position thereby to sustain said defrosting action while connected to said detent means, said movable member tending to compress said frozen liquid between said immersed portion of said member and said fixed part under the influence of said forces transmitted by said force transmitting means to form a thermally varying frozen liquid link between said member and said part to sustain said defrosting action, said frozen liquid link gradually reducing in length to a predetermined amount as said frozen liquid gradually melts at which amount substantially all said frost formed on said cooling unit has melted, and guide means cooperating with a portion of said detent means to effect automatically a sudden disengagement of said force transmitting means from said detent means after said frozen liquid link has diminished to said predetermined length as a result of said defrosting action, said sudden disengagement being effected by movement of said detent means clear of said force transmitting means to enable an instantaneous movement of said control means effected by said force producing means to return said defrosting means to its normally inactive condition, whereby the cycle may be repeated.

3. In a defroster control device for a refrigerating machine having a cooling unit subject to the formation of frost thereon and including defrosting means to provide heat for melting said frost, said defrosting means including means to control said heating action, the combination of means to actuate said control means for initiating said heating action to start the melting of said frost, movable means adapted to engage said control means and position same in relation to a fixed part of said refrigerating machine during said heating action, normally frozen liquid adjacent said fixed part, said movable means including means being within said frozen liquid and disposed to move therethrough to form an ice-connection between said movable means and said part, said frozen-liquid-connection being subject to the heat of said defrosting means to vary the position of said movable means within said frozen liquid as a function of said heat for controlling the duration of said heating action, means to effect a disengagement of said movable means from said control means for terminating said heating action after sufficient travel of said movable means through said frozen liquid incident to the melting of said frozen-liquid-connection as a result of said heat of said defrosting means.

4. The combination of elements defined in claim 2, in which said refrigerating machine includes a compressor driven by an electric motor connected in an electric circuit having a temperature controlled switch therein, a solenoid in said circuit connected to said actuating means for effecting movements of said control means, said solenoid being controlled by said switch.

5. The combination of elements defined in claim 2 in which said actuating means is manually operated.

6. The combination of elements defined in claim 2 in which said refrigerating machine includes a movable element actuated during normal operation of said refrigerating machine, and said actuating means includes a mechanism to count the number of normal actuations of said movable element, said, counting mechanism being effectively connected to said control means to effect movement thereof after a predetermined number of normal actuations of said movable element.

7. In a defroster control device for a refrigerating machine having a cooling unit including normally inactive defrosting means to effect a melting of ice forming on said cooling unit, a compressor driven by an electric motor connected in an electric circuit having a temperature-controlled switch therein to control each cycle of said motor and compressor, the combination of means to control the defrosting action of said defrosting means, electro-magnetic means in said circuit energized by said switch when the temperature within the refrigerating machine rises to effect one said compressor cycle, a counting mechanism, means operatively connecting said electro-magnetic means to said counting mechanism including means once for each said cycle, said counting mechanism including means disposed for intermittent connection with said control means for actuation thereof to initiate said defrosting action after a predetermined number of said cycles, movable means dependent on the freezing of water adjacent a fixed part of said refrigerating machine and including means adapted to effect an ice-connection between said fixed part and said control means for sustaining said defrosting action until said ice formed on said cooling unit is melted, and means to effect automatically a disengagement of said movable means with said control means upon sufficient melting of said ice-connection as a result of said defrosting action to terminate same and for returning said defrosting means to its normally inactive condition, whereby the cycle may be repeated.

8. In a control mechanism having means adapted to be controlled depenedent on the freezing of liquid, a device for controlling said controlled means, a fixed liquid-filled vessel associated with said device, said device including a sensing member immersed in said liquid and movable in a direction towards a wall of said vessel when said liquid is not frozen, said sensing member being so arranged in relation to said wall of said vessel to be constrained from movement by abutment with said frozen liquid tending to be compressed therebetween when said liquid freezes, the abutting position of said member being progressively altered smoothly when said frozen liquid gradually melts, and said sensing member being so arranged in relation to said controlled means that said freezing and melting of said liquid effects a control of said controlled means.

9. In a defroster control device associated with a refrigerating machine having a cooling unit subject to the formation of frost thereon and including defrosting means to effect a melting of said frost, the combination of means to activate said defrosting means for melting frost from said cooling unit, a fixed vessel filled with water and installed in relation to said cooling unit to freeze said water when said defrosting means is inactive and to melt said frozen water when said defrosting means is active, movable means including a sensing member immersed in said water and movable in relation to said vessel for controlling the duration of the active period of said defrosting means, said sensing member and said vessel being so arranged in relation to each other as to be effectively connected together by ice in said vessel when said water freezes under the influence of said cooling unit, said activation of said defrosting means effecting a change of said ice-connection produced by gradual melting thereof, the rate of said melting of said ice-connection being a function of the amount of said frost formed on said cooling unit, said melting rate being greater with a smaller accumulation of frost on said cooling unit, and conversely.

10. In a mechanism having movable actuating means and movable actuated means, ratchet means for intermittently transmitting movements of said actuating means to said actuated means after a predetermined number of intervening ratcheting movements of said ratchet means effected by movements of said actuating means, said ratchet means including driving means to effect said intermittent movements, each said intervening movement of said actuating means producing one said intervening ratcheting movement, the movement of said driving means being greater than the movement of said ratchet means during each said intervening ratcheting movement, a member associated with said ratchet means adapted to engage said actuated means to effect said intermittent transmitting movements after said predetermined number of intervening ratcheting movements, the length of the combined transmitting movements of said actuated means and said member and said ratchet means being greater than the length of the corresponding said intervening ratcheting movements of said ratchet means.

11. In a defroster control device for a refrigerating machine having a cooling unit subject to the formation of ice thereon and normally inactive defrosting means to effect a melting of said ice, the combination of movable actuating means, movable actuated means to activate said defrosting means for melting said ice, ratchet means for intermittently transmitting movements of said actuating means to said actuated means after a predetermined number of intervening ratcheting movements of said ratchet means effected by movements of said actuating means, said ratchet means including driving means to effect said intermittent movements, each said intervening movement of said actuating means producing one said intervening ratcheting movement, the movement of said driving means being greater than the movement of said ratchet means during each said intervening ratcheting movement, a member associated with said ratchet means adapted to engage said actuated means to effect said intermittent transmitting movements thereof for activating said defrosting means after said predetermined number of intervening ratcheting movements, the length of the combined transmitting movements of said actuated means and said member and said ratchet means being greater than the length of the corresponding said intervening ratcheting movements of said ratchet means, and means to inactivate said defrosting means after substantially all said ice is melted from said cooling unit.

12. In a defroster control device for a refrigerating machine having a cooling unit including normally inactive defrosting means to effect a melting of ice formed on said cooling unit comprising, movable control means to regulate the defrosting action of said defrosting means, swingable detent means hingeably connected to said control means, said detent means including catch means, actuating means adapted to effect corresponding movements of said detent means with said control means from their initial inactive positions thereof for initiating said defrosting action, a water-containing vessel secured to a fixed part of said refrigerating machine, said vessel being disposed in relation to said cooling unit to be in the flow-path of at least a part of said melting frost, said vessel being adapted to receive some of said melted frost for replenishing water that evaporates from said vessel, said water in said vessel being subjected to freezing temperatures when said defrosting means is inactive and subjected to melting temperatures when said defrosting means is active, ice-sensing means immersed in said vessel and movable in relation thereto from the free position of said ice-sensing means, said ice-sensing means including latch means adapted to be engaged by said catch means for intermittent connection therewith, first biasing means acting on said detent means to urge said catch means into engagement with said latch means, said intermittent connection being effected upon the movement of said actuating means and cooperating detent means and control means for activating said defrosting means, second biasing means acting on said control means and said cooperating detent means tending to return same to their said initial positions, third biasing means tending to urge said ice-sensing means toward its said free position during said engagement of same with said detent means, the force of said second-named biasing means opposing and overpowering the force of said third-named biasing means during said last engagement while said defrosting means is activated, said sensing means being effectively connected to said vessel by ice interposed therebetween under compression by said second named biasing means, the positions of said sensing means and said detent means and said control means then being established by said ice in said vessel for sustaining activation of said defrosting means, said second-named biasing means urging said control means and said detent means and said sensing means simultaneously to move gradually to follow the gradual melting of said ice connection, cam means, said detent means include a cam portion adapted to cooperate with said cam means under the influence of said first-named biasing means during said last-named gradual movement to effect movement of said detent means and said catch means thereof out of engagement with said latch means whereby said sensing means and said control means are released from each other, said third-named biasing means then causing said sensing means to return rapidly to its said free position, said second-named biasing means then causing said detent means and said control means to return rapidly to their initial inactive positions, said defrosting action being terminated only during said last rapid-return releasing movement as a result of the corresponding movement of said control means, whereby the said melted ice is again frozen by the cooling unit and the cycle may be repeated.

13. The combination of elements defined in claim 1 in which said refrigerating machine includes means operable incident to the normal operation of said machine, and said actuating means includes a mechanism disposed to count the number of said operations of said operable means to effect automatic initiation of said defrosting action, said counting mechanism being disposed to effect said initiating movement of said detent means after a predetermined number of intervening operations of said operable means, said counting mechanism including means to produce a longer travel of same and of said cooperating detent means during said initiating movement thereof than is produced by said counting mechanism during said intervening operations.

14. The combination of elements defined in claim 12 in which said refrigerating machine includes a compressor driven by an electric motor connected in an electric circuit having a temperature-controlled switch therein to control each cycle of said motor and compressor, electro-magnet means in said circuit connected to said actuating means for effecting said movements of said control means to initiate said defrosting action, said electro-magnet means being energized by said switch when the temperature within the refrigerating machine rises to effect one said compressor cycle, said actuating means including a mechanism to count the number of compressor cycles and affect said initiating movement of said control means connection after a predetermined number of said cycles.

15. In a defroster control device for a refrigerating machine having a cooling unit and including normally inactive defrosting means to effect a melting of ice forming on said cooling unit, means to control the defrosting action of said defrosting means, a sensing member having a portion disposed within a body of frozen liquid in said refrigerating machine and normally disconnected from said control means, means to connect said control means to said sensing member for initiating said defrosting action, said control means including means to cause said then-connected sensing member to abut against the unmelted frozen liquid and to move gradually therethrough as said frozen liquid progressively melts.

16. In a defroster control device for a refrigerating machine having a cooling unit including normally inactive defrosting means to effect a melting of ice forming on said cooling unit, the combination of means to control the defrosting action of said defrosting means, a sensing member having a portion disposed within a body of frozen liquid in said refrigerating machine and disconnected from said control means during normal operation of said machine, means to connect said control means to said sensing member for initiating said defrosting action, biasing means acting on said control means to cause said then-connected sensing member to abut against the unmelted frozen liquid under compression between said sensing member and a fixed part of said machine and to move therethrough as said frozen liquid progressively melts, means to effect a disengagement of said connection after a predetermined travel of said member through said frozen liquid during said last-named movement, said biasing means then returning said control means to its original position corresponding to said normal operation of said machine for terminating said defrosting action, means to return said sensing member upon said disengagement to its original position through the melted liquid path formed by said melting movement of said member, whereby the cycle may be repeated.

17. In a mechanism to regulate a controlled condition, the combination of, movable controlled means tending to maintain a normal status of said controlled condition, movable actuating means disposed to effect movements of said controlled means away from a normal position in substantially one direction, means disposed for sensing a change in said controlled condition and adapted to be connected intermittently to said controlled means for simultaneous movements therewith in a second direction tending to return said controlled means to said normal position, said intermittent connection being effected upon said movement of said actuating means and cooperating controlled means, said controlled means including means tending to effect a return of said controlled condition to its normal status when said controlled means is standing out of its said normal position, and means operable to effect a disengagement of said controlled means from said sensing means when the controlled condition returns substantially to its normal initial status, whereby the device is returned to its normal condition and the cycle may be repeated.

18. The combination of means defined in claim 17, and said controlled means including a detent member having latch means, and said sensing means including catch means disposed to engage said latch means to produce said intermittent connection, and said means operable to effect a disengagement of said controlled means including cam means disposed to cooperate with said detent member to produce said disengagement of said latch means from said catch means.

19. In a mechanism to regulate a controlled condition, the combination of, movable controlled means tending to maintain a normal status of said controlled condition, movable actuating means disposed to effect movements of said controlled means away from a normal position in substantially one direction, said actuating means including a ratcheting device to effect said last-named movement after a predetermined number of ratcheting movements of said device, means disposed for sensing a change in said controlled condition adapted to be connected intermittently to said controlled means for simultaneous movements therewith in a second direction tending to return same to said normal position, said intermittent connection being effected upon said movement of said actuating means and cooperating controlled means, said controlled means including means tending to effect a return of said controlled condition to its said normal status when said controlled means is standing out of its said normal position.

20. The combination of means defined in claim 19, in which said ratcheting device comprises, ratchet means for intermittently transmitting movements of said actuating means to said controlled means after a predetermined number of intervening ratcheting movements of said ratchet means effected by movements of said actuating means, said ratchet means including driving means to effect said intermittent movements, each said intervening movement of said actuating means producing one said intervening ratcheting movement, the movement of said driving means being greater than the movement of said ratchet means during each said intervening ratcheting movement, a member associated with said ratchet means adapted to engage said controlled means to effect said intermittent transmitting movements, the length of the combined transmitting movements of said controlled means and said member and said ratchet means being greater than the length of the corresponding said intervening ratcheting movements of said ratchet means.

21. In a defroster control device for a refrigerating machine having a cooling unit subject to the formation of ice thereon and including normally inactive defrosting means to effect a melting of said ice, control means to activate said defrosting means for melting said ice, means to inactivate said defrosting means when substantially all said ice is melted, said inactivating means including sensing means having a part immersed within a body of frozen liquid fixed in relation to a portion of said machine, and force-producing means to cause said immersed sensing part to abut against said frozen liquid tending to compress same against said fixed machine portion and to cause said part to move gradually through said frozen liquid to a predetermined distance upon progressive melting of said frozen liquid to effect said inactivation of said defrosting means.

22. In a mechanism associated with apparatus subject to the freezing of water therein and including normally inactive means to effect a melting of said ice, control means to activate said melting means for melting said ice, movable means including a sensing member immersed within a body of ice fixed in relation to a portion of said apparatus, said movable means also including means disposed to be intermittently connected for simultaneous cooperative movements with said control means during activation of said melting means, and force-producing means to cause said sensing member to abut against said ice tending to compress same in relation to said fixed portion during said intermittent connection, said force producing means urging said sensing member to move gradually through said ice a predetermined distance upon progressive melting of said ice, and means to disengage said intermittent connection during said cooperative movements to cause inactivation of said melting means upon said predetermined movement of said sensing member.

23. In a mechanism having movable actuating means and movable actuated means, ratchet means for intermittently transmitting movements of said actuating means after a predetermined number of intervening ratcheting movements of said ratchet means effected by movements of said actuating means, a ratchet wheel having a predetermined number of counting teeth, movable ratchet means connected to said actuating means to be actuated thereby, said ratchet means including latch means to engage and actuate one said counting tooth upon each said movement of said actuating means to effect movement of said wheel corresponding to one counting tooth-length, pawl means to prevent a reverse movement of said ratchet wheel, said ratchet wheel carrying a driving tooth in addition to said counting teeth, said latch means disposed to engage and actuate said driving tooth after a predetermined number of intervening actuations of said counting teeth, the length of travel of said latch means and cooperable driving tooth being greater than the length of travel of each said counting tooth effected by one total movement of said actuating means, trigger means associated with said wheel adapted to engage and actuate said actuated means after said predetermined number of intervening actuations of said wheel, said trigger means being so arranged in relation to said wheel and said actuated means that said last-named engagement and actuation thereof is simultaneous with and effected by said engagement and actuation of said driving tooth by said latch means to produce a longer travel of said actuated means during said first intermittent movements than would be produced during said intervening actuations of said counting teeth, said movement of said actuated means thereby being initiated after a predetermined number of movements of said actuating means.

24. The combination of elements defined in claim 23, and said latch means including a contoured guide portion disposed to engage a guide member to produce a predetermined locus of movement of said latch means, said locus being such as to effect said engagement of said latch means with one of said counting teeth during only a predetermined portion of said greater travel of said latch means to cause movement of each said counting tooth only one tooth-length for each actuation of said latch means.

25. The combination of means defined in claim 16, in which said refrigerating machine includes a compartment containing said cooling unit and door means enclosing said compartment, means actuated by said door means upon each normal operation thereof, and a mechanism operated by said door-actuated means and including means to effect said connection of said control means to said sensing member for initiating said defrosting action after a number of operations of said door means.

26. In a defroster control device for a refrigerating machine having a cooling unit subject to the formation of frost thereon and including normally inactive defrosting means to effect a melting of said frost, control means to activate intermittently said defrosting means for melting said frost, means to inactivate said defrosting means when substantially all said frost in melted, said inactivating means including sensing means having a part immersed within a vessel of ice fixed in relation to said machine, and force producing means to cause said immersed sensing part to abut against said ice tending to compress same against a wall of said vessel and to cause said member to move gradually through said ice a predetermined distance upon progressive melting of said ice to effect inactivation of said defrosting action, said vessel including a portion thereof located in relation to said cooling unit to be in the flow path of at least a part of said melting frost, whereby water evaporated from said vessel is replaced.

27. In a defroster control device for a refrigerating machine having a cooling unit subject to the formation of frost thereon and including normally inactive defrosting means to effect a melting of said frost, means to activate said defrosting means for melting said frost, means to inactivate said defrosting means when substantially all said frost is melted, said inactivating means including sensing means within said frost forming on said cooling unit, and force-producing means to cause said sensing means to abut against a portion of said frost tending to compress same in relation to a fixed part of said cooling unit and to cause said member to move gradually through said frost a predetermined distance upon progressive melting of said frost to effect said inactivation of said defrosting means.

28. The combination of elements defined in claim 27 in which said cooling unit includes an evaporator tube subject to the formation of frost thereon, said fixed part of said cooling unit including wall means having a surface projecting from said tube, and said sensing means abutting said frost formed on said tubing means in relation to said surface in a direction tending to compress said frost.

References Cited in the file of this patent

UNITED STATES PATENTS

| | | |
|---|---|---|
| Re. 18,263 | Day | Nov. 24, 1931 |
| 1,759,945 | Hull | May 27, 1930 |
| 1,999,191 | Hirschl | Apr. 30, 1935 |
| 1,999,930 | Hirschl | Apr. 30, 1935 |
| 2,069,782 | Sluman | Feb. 9, 1937 |
| 2,085,868 | Pick | July 6, 1937 |
| 2,174,776 | Buchanan | Oct. 3, 1939 |
| 2,324,309 | McCloy | July 13, 1943 |
| 2,500,298 | Smith | Mar. 14, 1950 |
| 2,595,967 | McCloy | May 6, 1952 |
| 2,687,620 | Raney | Aug. 31, 1954 |
| 2,709,341 | Gallagher et al. | May 31, 1955 |